United States Patent [19]

Liu

[11] Patent Number: 5,101,715
[45] Date of Patent: Apr. 7, 1992

[54] STRUCTURE OF A ROTISSERIE

[76] Inventor: Chi-Yu Liu, 274-31, Hsi Nan Road, Pa Village, Wu Kou Hsiang, Taichung County, Taiwan

[21] Appl. No.: 723,859

[22] Filed: Jul. 1, 1991

[51] Int. Cl.$^5$ .............................................. A47J 37/04
[52] U.S. Cl. .................... 99/421 V; 99/419; 99/421 R; 99/451; 126/41 A
[58] Field of Search ................ 99/339, 341, 352, 353, 99/357, 419, 420, 421 R, 421 V, 426, 427, 446, 447, 448, 449, 451, 443 C, DIG. 14; 126/41 A, 41 R, 25 R, 276; 426/523

[56] References Cited

U.S. PATENT DOCUMENTS

| 2,581,570 | 1/1952 | Amanatides | 99/421 V |
| 2,687,080 | 8/1954 | Dorin | 99/421 V |
| 3,604,341 | 9/1971 | Coroneos | 99/446 |
| 3,817,164 | 6/1974 | Hintze | 99/421 V |
| 3,956,979 | 5/1976 | Coroneos | 99/447 |
| 4,300,443 | 11/1981 | Morcos et al. | 99/449 |
| 4,512,248 | 4/1985 | Volakakis | 99/447 |
| 4,590,848 | 5/1986 | Willingham | 99/443 C |
| 4,612,851 | 9/1986 | McManus | 99/419 |
| 4,787,302 | 11/1988 | Waltman et al. | 99/427 |
| 4,979,439 | 12/1990 | Ferron-Zepeda | 99/421 H |

FOREIGN PATENT DOCUMENTS 3214818 11/1983 Fed. Rep. of Germany .... 99/421 R
3410766 10/1984 Fed. Rep. of Germany ... 99/421 V Primary Examiner—Timothy F. Simone

[57] ABSTRACT

An improved structure of a rotisserie, the improvement comprising, a rearrangement of the infra-red heaters to a position not in direct view of the operator, so as to not expose him to its infra-red rays, and the provision of a plurality of circular food holders adjustably positionable on a vertically oriented rotisserie spit on which small items of food can be supported with the aid of food stakes. Small drip dispensors can also be disposed on the circular food holders to supply cooking fluids to food articles hung below them.

3 Claims, 6 Drawing Sheets

STRUCTURE OF A ROTISSERIE

BACKGROUND OF THE PRESENT INVENTION

The present invention relates to a rotisseries of improved structure and more particularly to an improved rotisserie that subjects the operator to less heat while operating the rotisserie and that allows more convenient handling of small pieces of food.

Conventional rotisserie suffer from a number of deficiencies of which two are most notable. Firstly, the infra-red heating sources, be they electrically or gas operated, are normally set opposite the opening where the operator manipulates the rotisserie spit, thus exposing not only the foot to be roasted, but also the operator, to infra-red rays, this not only is fatiguing, but also may cause permanent eye damage after prolonged exposure.

Secondly, food items are normally set in place by impaling them on a long rotisserie spit which is slowly rotated by a motor. Though this is satisfactory for large items, from which smaller pieces are sliced off as needed, it becomes inconvenient when many small pieces of food are to be roasted.

The improved structure rotisserie solves both these problems first by placing the infra-red heaters in a position facing away from the operator so as to not expose him to its radiation, and secondly by providing a number of circular food holders secured to a central rotisserie spit set in a vertical orientation, from which several small items of food impaled on small food stakes can be supported.

The circular food holders rotate along with the central rotisserie spit to uniformly roast the food items and, moreover, could include a self applying oil system for basing or flavoring.

Summary of the Present Invention

The improved structure rotisserie has as a first objective to provide a rotisserie that does not subject an operator to infra-red radiation from the heaters, and a second objective of providing an improved structure rotisserie that better accommodates the roasting of small items of food.

Referring to FIG. 1, conventional rotisseries normally position their electric or gas powered infra-red heaters 3 in a rear wall 2 with the operator 4 in front, and the motor driven spit 5 in between, so as to allow operator 4 to easily manipulate food items 6 impaled on the spit 5. Unfortunately, this arrangement exposes the operator to infra-red rays from the heaters.

The improved structure rotisserie of the present invention avoids this problem by positioning its infra-red heaters to the front, behind left and right side panels, as shown in FIGS. 2 and 3. The heaters are thus between the spit and the operator, directing their infra-red heat rays towards the spit and any food items there but away from the operator. The first objective of the present invention is thus satisfied.

To satisfy the second objective, a number of food holders are provided that can be adjustably positioned along the spit, as shown in FIG. 9.

The food holders are wire frames of a roughly circular shape with numerous small eyelets on its periphery. Stakes with stoppers on one end can be used to impale small food items and placed upright between an upper and lower food holder. The stoppers on the lower ends of the stakes would fit into eyelets of the lower food holder and the painted upper ends would be upheld by eyelets on the upper food holder.

The stakes could be applied and removed independently and have a much smaller diameter than the main spit making it much more suitable for handling small food items.

In addition, the eyelets of a food holder can accomodate small drip dispensers that drip feed oil or sauce onto food items held on stakes between food holders on lower levels, further adding to the rotisseries versatility.

A detailed description of all features of the improved structure rotisserie is given in the preferred embodiment below.

PREFERRED EMBODIMENT OF THE PRESENT INVENTION

Figure 1:
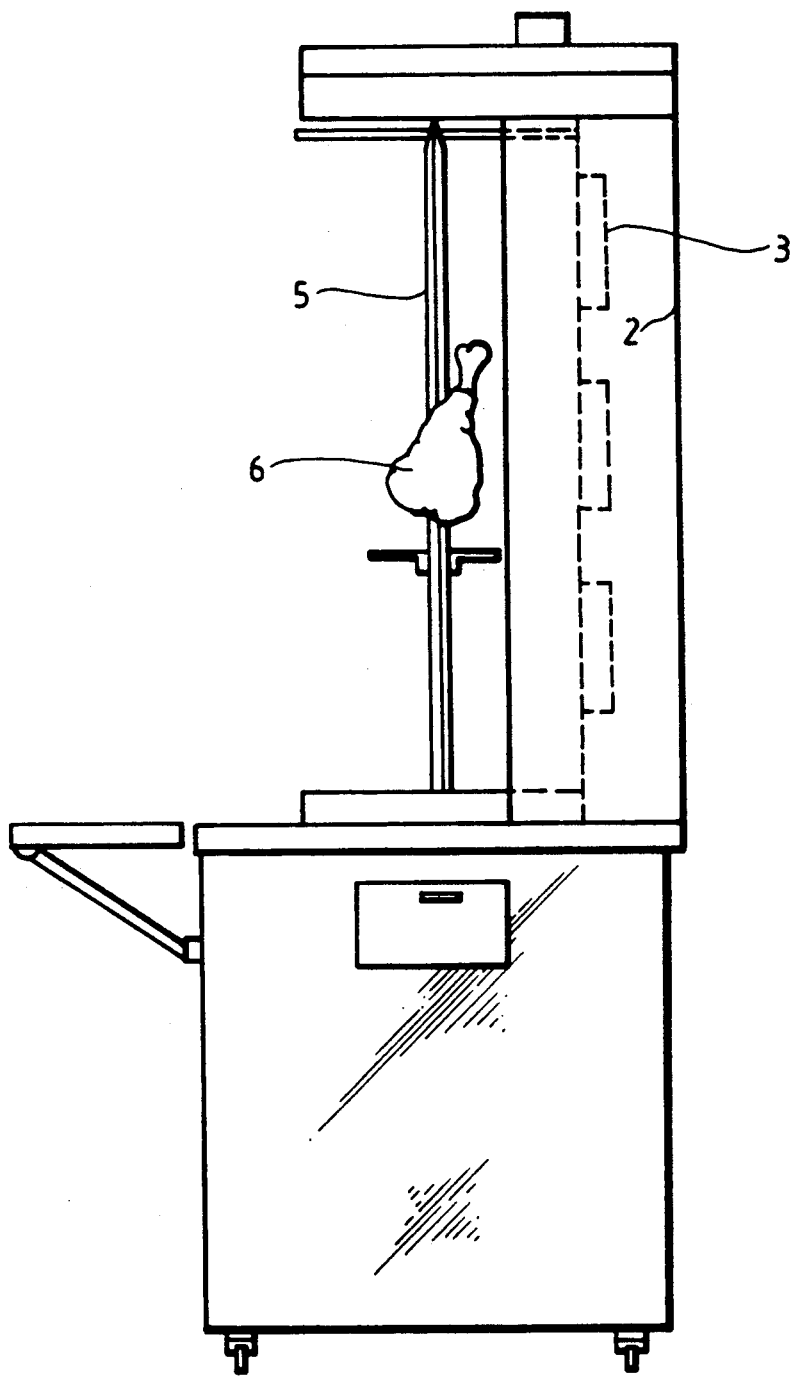
FIG. 1 is a side view of a conventional rotisserie.
Figure 2:
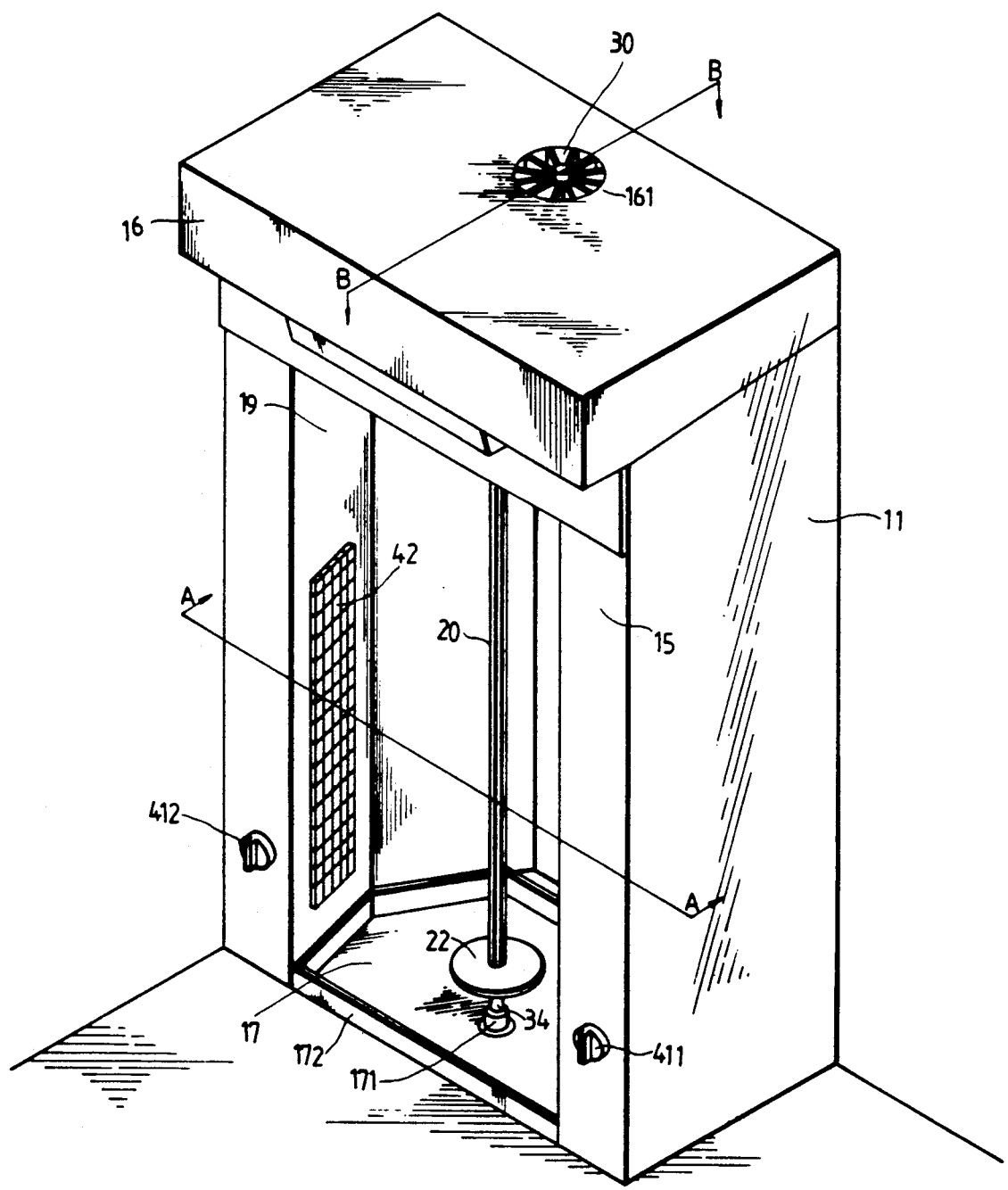
FIG. 2 is a perspective view of the improved structure rotisserie of the present invention.
Figure 3:
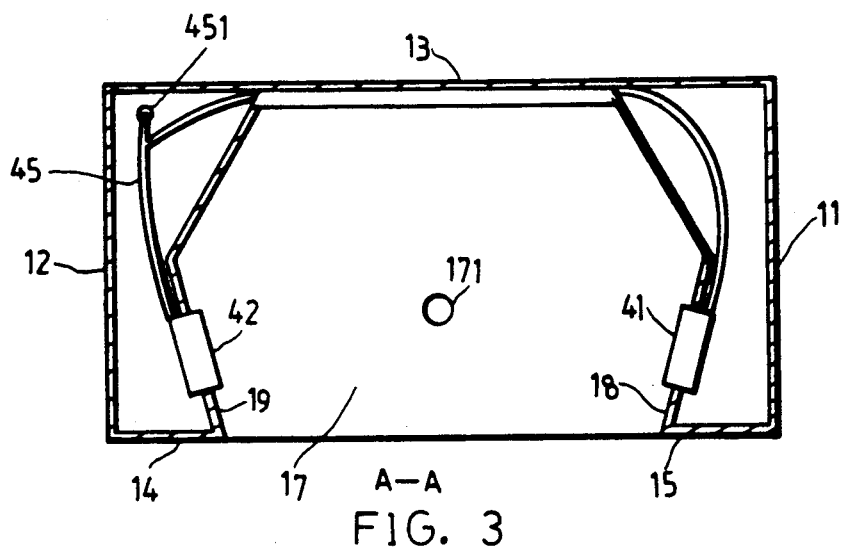
FIG. 3 is a cross-sectional view of the improved structure rotisserie of the present invention taken along line A—A of FIG. 2.
Figure 4:
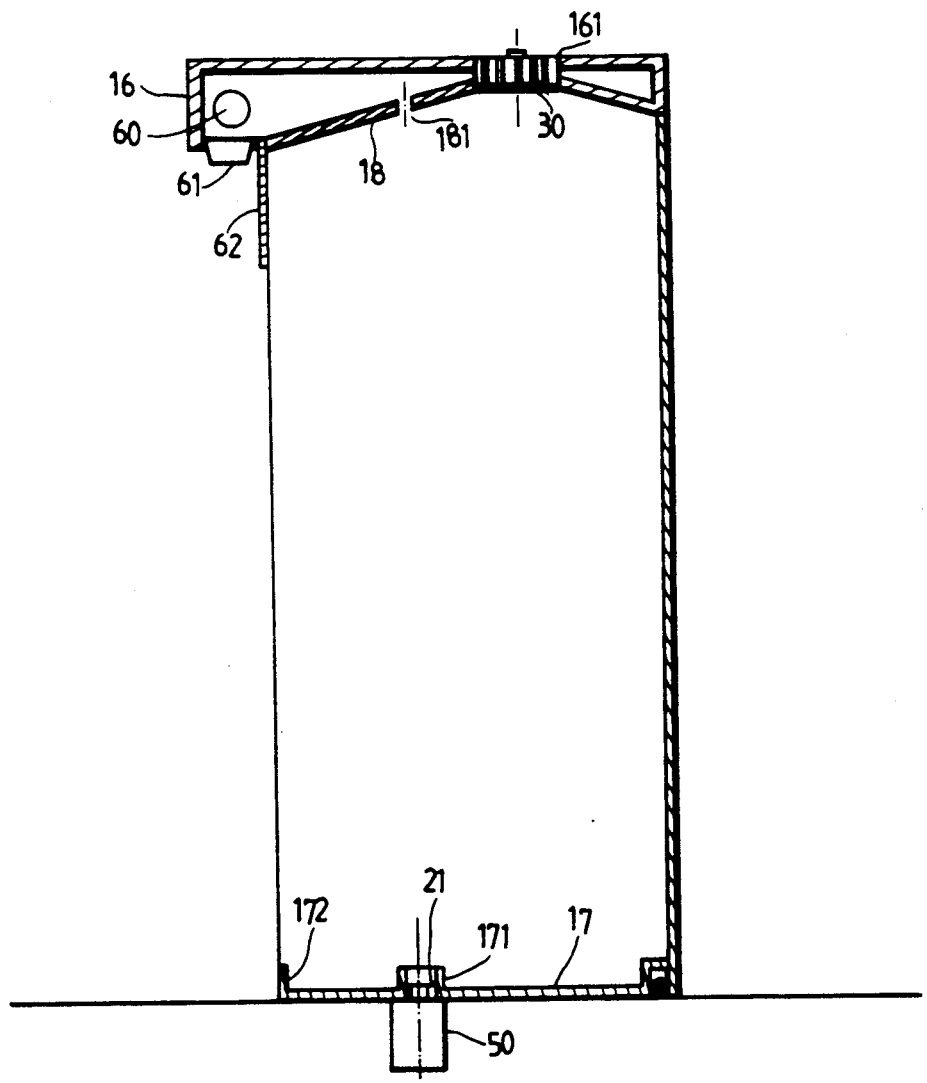
FIG. 4 is a cross-sectional view of the improved structure rotisserie of the present invention taken along line B—B of FIG. 2.

Referring to FIGS. 2, 3, and 4, the improved structure rotisserie of the present invention comprises a housing composed externally of a right side wall 11, a left side wall 12, a rear wall 13, a right panel 15, a left panel 14, and a hood 16. To the interior, a centrally located main spit 20 extends from a circular sleeve 171, formed on a pan 17 situated at the base of the housing, and extends through an upper port 181, formed on a funnel 18 disposed below hood 16. A funnel shaped roof 18 efficiently transports air to a fan 30, located below a circular vent 161 formed on hood 16.

A rim 172 is formed on the periphery of pan 17, which collects cooking residues and can be removed for cleaning by first removing main spit 20.

Main spit 20 can be removed from the housing by disengaging it from a coupling 21 in sleeve 34 and easing it out of upper port 181. In operation, coupling 21 rotatably secures main spit 20 to a high torque motor 50 which slowly rotates it.

A pair of gas powered infra-red heaters 41 and 42 are disposed respectively on right inner wall 18 and left inner wall 19, which are formed at acute angles to respective adjoining right panel 14 and left panel 15. The infra-red radiation from the heaters are thus directed inwards towards main spit 20 and away from the operator.

Heating gas is supplied to the heaters through copper gas pipe 45, which extends from a pipe inlet 451 formed on the base of the housing. The gas supply to infra-red heaters 41 and 42 can be adjusted by respective control knobs 411 and 412, situated respectively on right panel 14 and left panel 15.

To assist the operator, a flourescent light 60 within a light cover 61 is provided, being positioned under the front overhang of hood 16. A thermal plate 62, made of a heat insulating material, separates flourescent light 60, and its electrical components, from the main body of the housing so as to protect them from heat.

When roasting large items of food, the articles are impaled on main spit 20, with adjustable support plate 22 secured below the food items to prevent them from sliding, as with a conventional rotisserie.

However, when numerous small items of food are to be roasted, circular food holders 70 and food stakes 90 are utilized.

Figure 5:
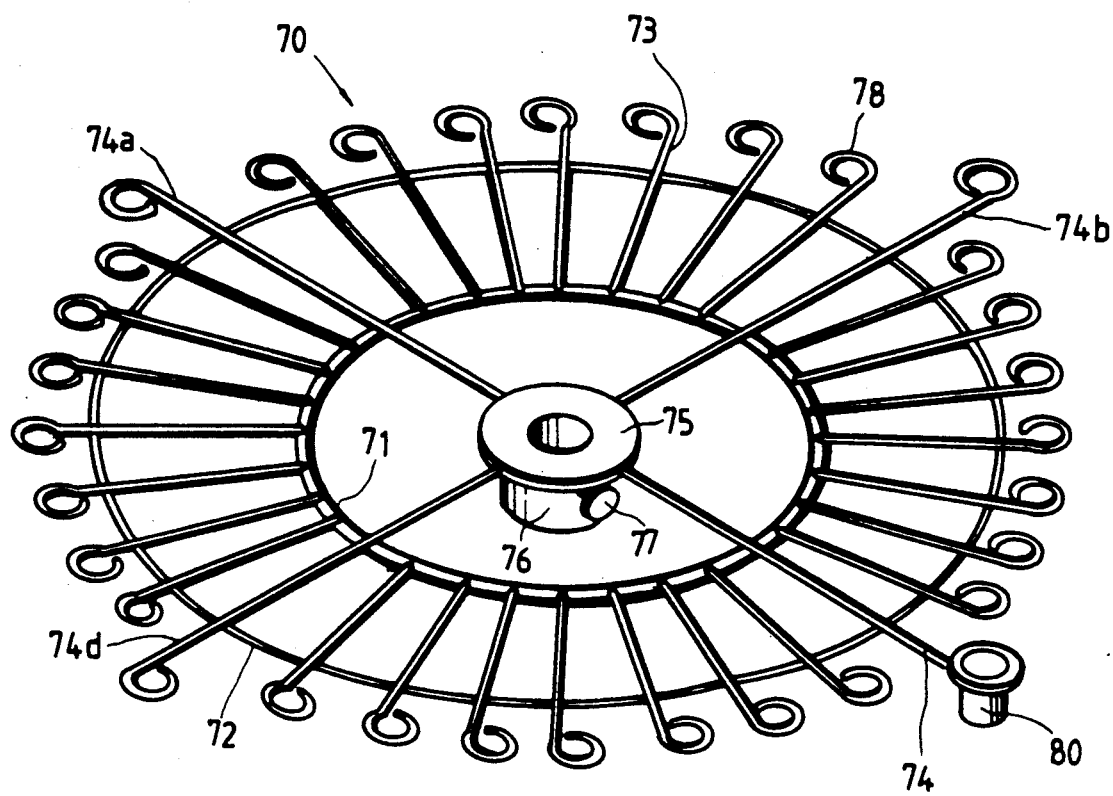
FIG. 5 is a perspective view of a food holder structure used in the improved structure rotisserie of the present invention.

Referring to FIG. 5, circular food holder 70 comprises a roughly circular frame defined by concentrically disposed inner ring 71 and outer ring 72, and a plurality of spoke wires 73 extending outwardly in radial directions between the two rings. One end of each spoke wire 73 is welded to inner ring 71 while the other end extends to and beyond outer rim 72, with a weld on the point of contact. These outer ends are bent to form circular eyelets 78.

There are four spoke wires 73, in arms 74a, 74b, 74c, and 74d, that extend within the radius of inner ring 71, and join with a disc 75 on a collar 76. The collar 76 allows food holder 70 to be slid along main spit 20 to a suitable position where it can be secured in place by screw 77.

Figure 6:
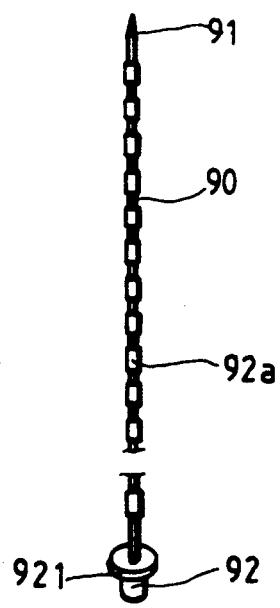
FIG. 6 is a view of a food stake used with the food holder structure of FIG. 5.

Food stake 90 is an elongate rod with a sharp tip 91 formed on one end and a cylindrical stopper 92 formed on the other, as shown in FIG. 6. Cylindrical stopper 92 has a raised edge 921. A plurality of enlarged cinctures 92a are formed along the length of food stake 90 so as to more firmly grip food items thereon.

Whereby, a food stake 90 can be held in place by inserting its stopper 92 into an eyelet 78 of a first food holder 70a. The cylindrical lower body of stopper 92 passes through eyelet 78 but edge 921 comes to rest therein. The upper end of food stake 90 is inserted through and retained by a similar eyelet 78 on a second food holder 70b, positioned higher than first food holder 70a, as shown in FIG. 8.

Figure 7:
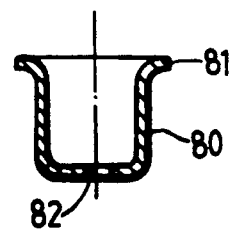
FIG. 7 is a sectioned view of the drip dispensor used with the food holder of FIG. 5.

In addition, a drip dispensor 80, as shown in FIGS. 5 and 7, can also be disposed in an eyelet 78 of a food holder 70, and drip feed cooking fluid or flavoring onto food items impaled on a food stake 90, held by food holders 70 on lower levels.

Drip dispensors 80, have a lip 81, similar to raised edge 921 of stopper 92, a cylindrical body, and a small orifice 82 formed on the bottom thereon, from which contained fluids drip out from.

Figure 8:
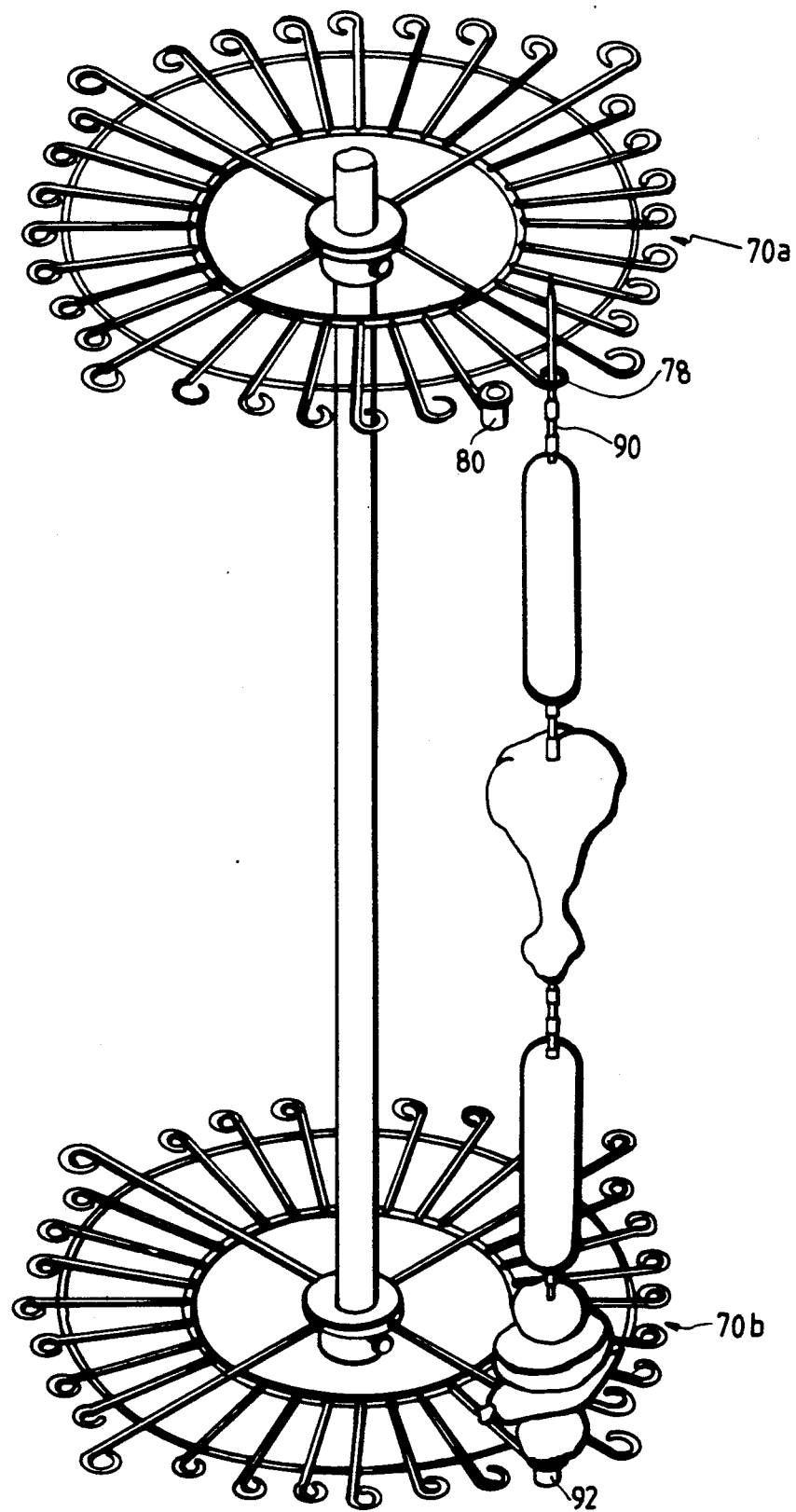
FIG. 8 is a perspective view of a food stake on which is impaled several small food items, set between two food holders attached to the main spit.
Figure 9:
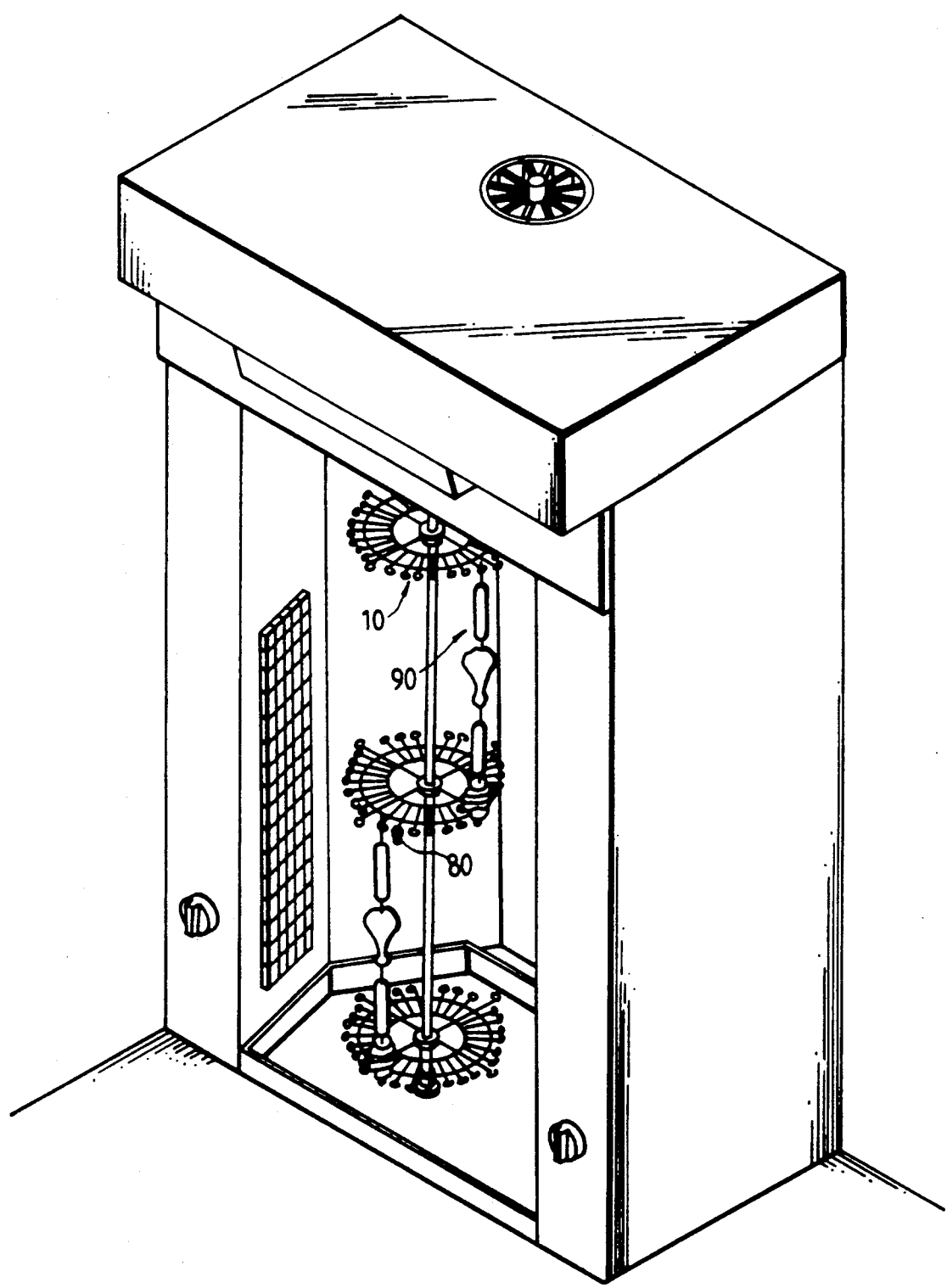
FIG. 9 is a perspective view of the improved structure rotisserie of the present invention showing the food holders and stake used to roast small items of food.

As shown in FIG. 8, a food stake 90 is positioned between an uppermost and medial food holders 70 and between the medial and a lowermost food holders 70, with small food items impaled thereon. Drip dispensors 80 are also disposed within selected eyelets 78 of the uppermost and medial food holders 70, dripping cooking fluid onto the foot items below.

I claim:

1. An improved structure rotisserie comprising a housing, a main spit, disposed vertically within said housing and rotated by a motor, and a frontal opening, defined by said housing, through which an operator has access to said main spit and any food items thereon, wherein:

a pair of infra-red heating elements are disposed respectively behind a front left wall and a front right panel, disposed respectively to either side of said frontal opening of said housing, whereby infra-red heating rays are directed rearwards towards said main spit and away from said operator;

a plurality of circular food holders are provided, with each said food holder comprising a plurality of circular eyelets arranged in a circle and supported by a wire frame attached to a central collar that can be releasably secured to said main spit at any position thereon by means of threaded fastener;

whereby, a food stake, on which small items of food can be impaled, has a stopper disposed on one end that can securely rest within a small eyelet, so that said food stake can be held in place by placing said stopper of a said food stake in a said eyelet of a first said food holder, and positioning the opposite end of said food stake within an eyelet of a second said food holder that is in a higher position on said main spit than said first food holder.

2. An improved structure rotisserie according to claim 1, wherein cylindrical cup shaped drip dispensors, with orifices disposed on the bottoms thereon, can be placed within said eyelets of said food holders to drip fluid useful to the cooking process on food items disposed below said drip dispensors.

3. An improved structure rotisserie according to claim 1, wherein a roof disposed within said housing, above said main spit, is funnel shaped so as to aid the air flow to a fan disposed on the top of said housing, further reducing the heat transmitted to said operator.

* * * * *